Feb. 17, 1942. E. R. POTTER 2,273,329
TREE TRIMMING DEVICE
Filed April 5, 1940 2 Sheets-Sheet 2
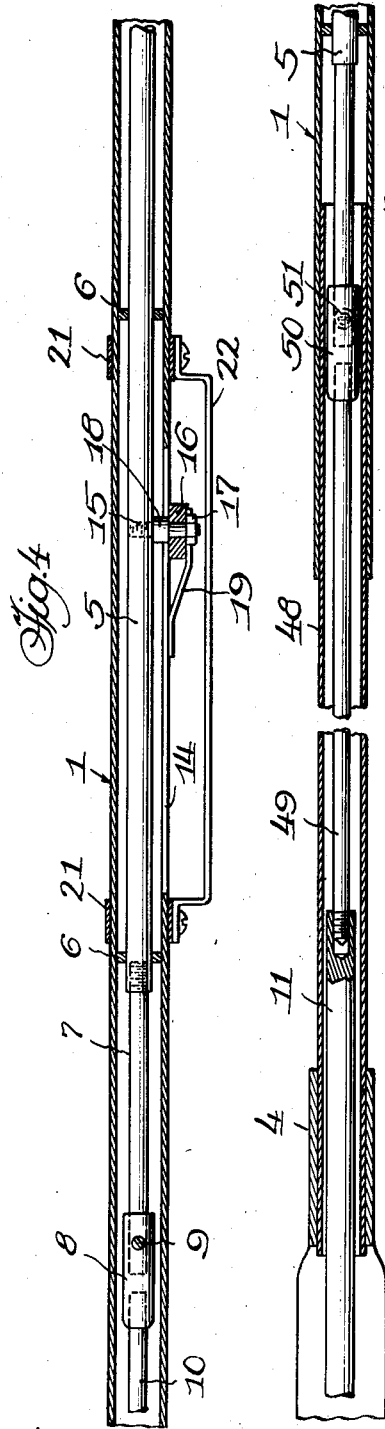
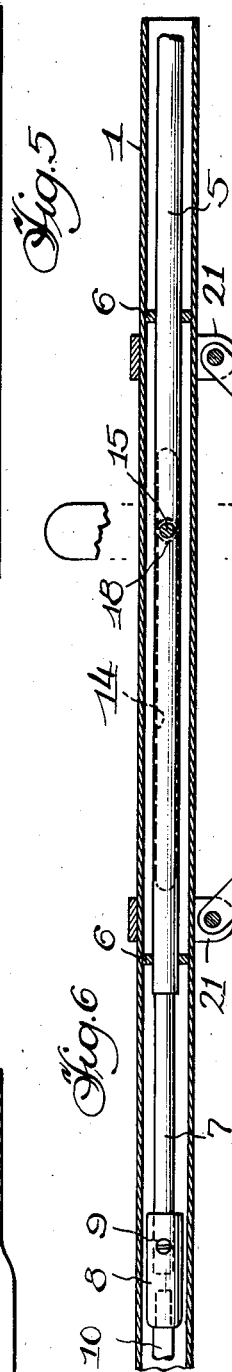
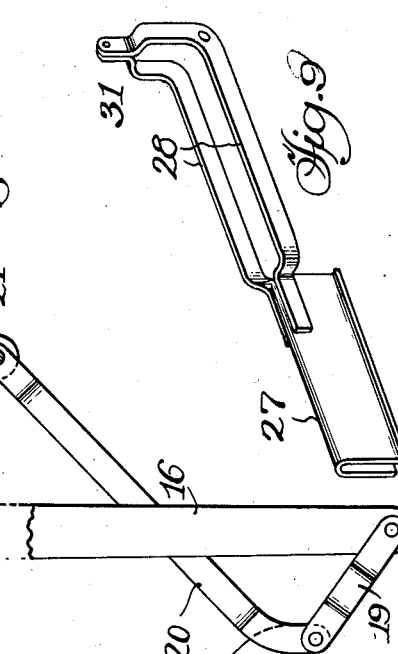
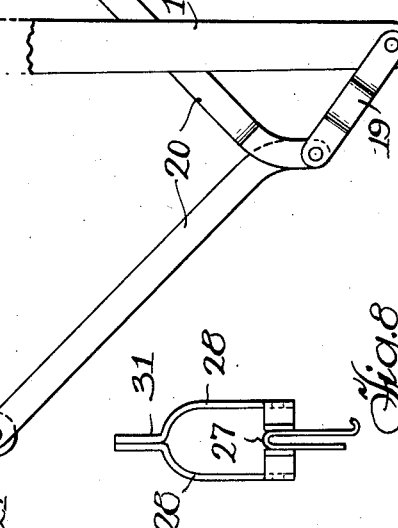
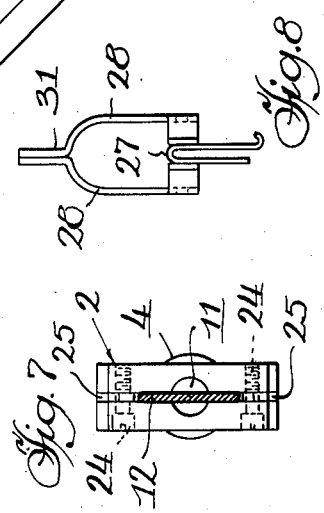
INVENTOR.
Elbert R. Potter
BY Parkinson & Lane
ATTORNEYS.

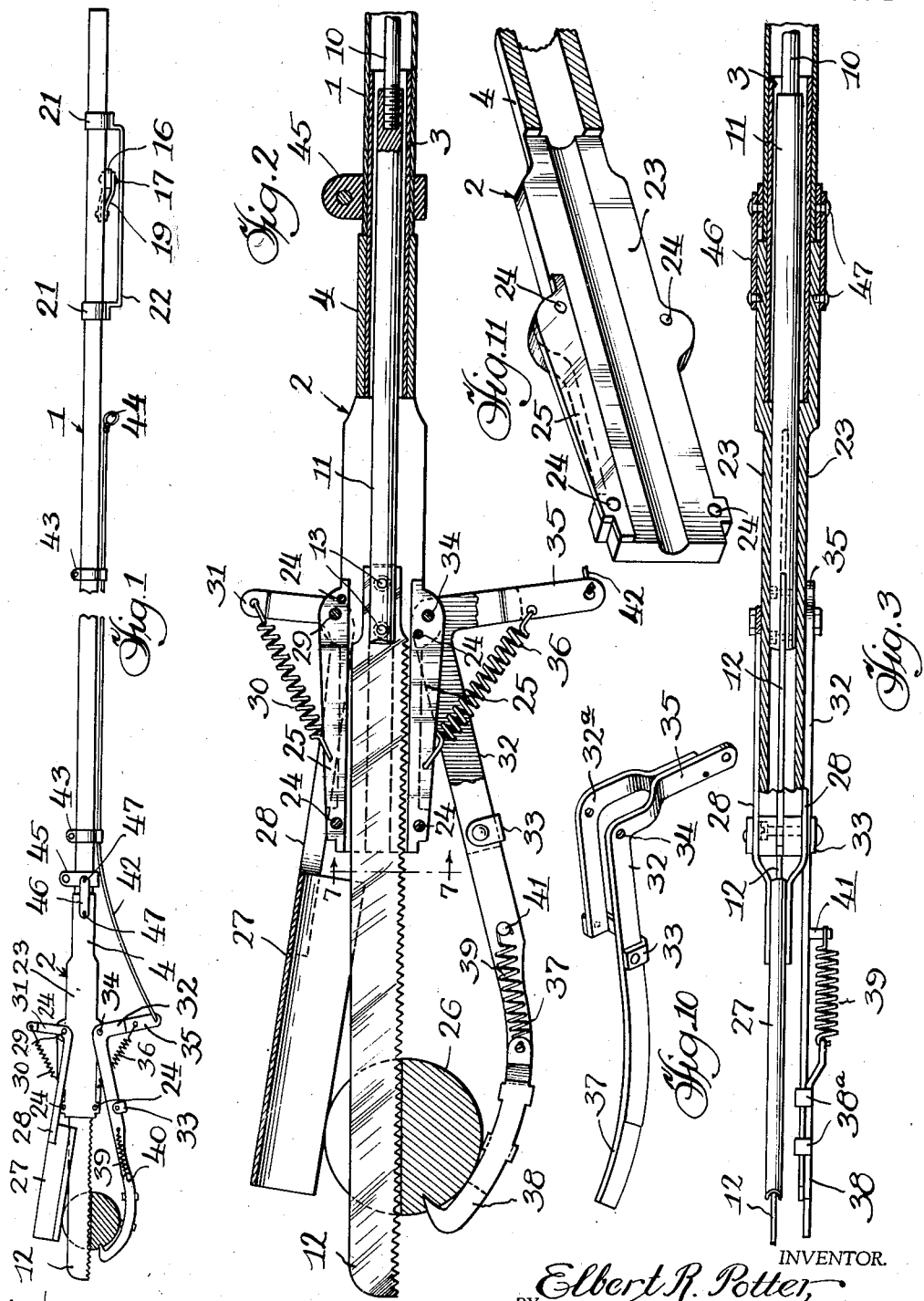

Patented Feb. 17, 1942

2,273,329

UNITED STATES PATENT OFFICE 2,273,329

TREE TRIMMING DEVICE

Elbert R. Potter, Chicago, Ill., assignor of one-half to Rex D. Wray, Bloomington, Ill.

Application April 5, 1940, Serial No. 328,005

5 Claims. (Cl. 30—166)

The present invention relates to a tree trimming device and more particularly to a device for sawing or severing limbs from a tree, where the operator may stand upon the ground or at some distance from the limb to be severed and operate the trimmer. The embodiment comprehends a novel construction of operating mechanism for actuating the saw blade and for guiding this blade and maintaining it rigid and against buckling, especially during the initial cutting stage.

The present device may be made in any length desired and is provided with an extension which may be readily applied to the device whenever the operator requires additional length to reach a limb.

The invention further comprehends a novel means and mechanism for applying pressure to the saw blade so that the limb may be cut in a minimum of time and with a minimum of effort.

Further objects are to provide a construction of maximum simplicity, efficiency, economy and ease of assembly and operation and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Fig. 1 is a view in side elevation of the novel construction with a portion thereof broken away.

Fig. 2 is a fragmentary enlarged view, part in side elevation and part in vertical cross section of the forward end of the novel trimming device.

Fig. 3 is a view, part in top plan and part in horizontal cross section of so much of the device as is shown in Fig. 2.

Fig. 4 is a view, part in side elevation and part in vertical cross section of the rearward portion of the trimmer.

Fig. 5 is a fragmentary view, part in plan and part in vertical cross section of the device provided with an extension or coupling whereby to increase its over-all length.

Fig. 6 is a view, part in side elevation and part in horizontal cross section of the rearward end of the device.

Fig. 7 is a view in vertical cross section taken in a plane represented by the line 7—7 of Fig. 2.

Fig. 8 is a view in end elevation of the saw guide.

Fig. 9 is a view in vertical cross section of this guide.

Fig. 10 is a view in perspective of the tree limb holder.

Fig. 11 is a fragmentary view in perspective of one section of the saw holder.

In the drawings, the novel embodiment is shown as constructed of a section of hollow tubing 1 of any desired length connected to a saw holder 2 by a length of tubing 3 adapted to be conformably but removably received in the reduced end 4 of the saw holder and the forward end of the tubing 1. Slidably mounted within this tubular member 1 is an operating rod consisting of a section of tubing 5 slidable in spaced bearings 6 and internally threaded at its forward end for connection with a rod section 7 secured to a turnbuckle or other coupling 8 by a set screw 9, and a rod section 10 suitably anchored at its rearward end in the turnbuckle or coupling 8 and at its forward end received in and connected to the rod section 11. To the forward end of the section 11 is secured the saw blade 12 by means of screws, bolts or the like 13.

It is to be understood that the sections 5 and 7, coupling 8 and rod sections 10 and 11, when assembled, are rigidly secured together so that they operate as a unit for reciprocating the saw in its cutting operation. In order to reciprocate and actuate the operating rod, the invention comprehends forming the tubing 1 with an elongated slot 14 through which extends an actuating pin 15 having its one end secured in the rod section 5 and its other end secured in a handle 16 by means of a lock nut 17, an enlargement or guide collar 18 being provided on this pin intermediate its ends and of such size as to conformably seat in and slide within the elongated slot 14.

Pivotally mounted to one end of the handle 16 is a pair of links 19, there being one on each side of the handle, which links in turn are pivotally connected at their opposite ends to an end of a pair of handle supports 20, 20, each in turn being connected at its other end to a bracket 21 anchored upon the tubing 1. By reason of the fact that the handle 16 and links 19 are freely pivoted, this handle is permitted to be reciprocated or oscillated back and forth by the operator to the full extent or length of the slot 14 within a guide 22.

The saw holder 2 is made sectional and consists of complementary parts 23 connected together by means of bolts or the like 24 but spaced or separated by saw blade spacer plates 25 in such manner as to provide a slot for reciprocating movement of the rod section 11 as well as the saw blade 12.

In order to guide the blade into cutting relation with the limb 26, the invention comprehends a novel guide comprising a substantially inverted U-shaped member 27 secured at its one end to a pair of spaced arms 28 which are pivotally mounted at 29 upon the saw holder and which are maintained in close relation with the blade by means of a spring 30 secured at one end to the saw handle and at its other end to an outer extension 31 of the arms 28. By means of the spring arrangement, this guide is always maintained in its guide relationship with the blade so that in the initial cutting operation, the blade can not buckle but is maintained in its proper position for operation.

In order to anchor the cutting end of the trimmer onto the limb, the invention comprehends a novel form of holder comprising a pair of arms 32 and 32a suitably connected together by means of a spacer bracket 33 and pivotally mounted at 34 to the opposite sides of the saw holder 2, with one end 35 of the bell crank secured to a spring 36 and the other end of this spring anchored onto the saw holder, for the purpose of applying pressure to the saw blade and maintaining this blade under pressure whereby to secure most efficient results and optimum cutting action in a minimum period of time. At the forward end 37 of the arm 32 is slidably mounted a limb hook 38 adapted to anchor in the limb and hold the trimmer in position for the cutting operation. This hook is slidably maintained by the bent-over ears 38a and is retained in anchored position by the weight of the unit, by the spring 36 and by a spring 39 secured at one end in an opening 40 in the rear end of the hook 38 and at its other end onto a pin or projection 41 on the arm 32, but may be released by means of a cord or chain 42 passing through loops in the clips 43 mounted at spaced distances on the tubing 1, the cord or chain being provided with a hook or other suitable handle 44 which permits the operator to pull thereon and to release the hook.

In order to secure the tubing 1 and saw holder 2 in assembled relation, a bracket 45 is mounted upon the tubing 1 and is connected to the saw holder 2 by means of a pair of links 46 secured to the saw holder and bracket by bolts or the like 47.

The novel construction thus far described relates to a trimming device which may be of any desired length suitable for the purpose. However, the invention comprehends the use of an extension whereby the device may be extended to any desired length. This may be simply and readily done by substituting for the coupling 3 an elongated coupling tube 48 of the required or desired additional length, and the substitution of an operating rod section 49 of the desired length, or by the insertion of an extra length of operating rod suitable for the purpose. This substitution may be quickly accomplished, merely requiring the removal or sufficient loosening of the set screw 9 through an opening provided therefor in the tubing 1, and the removal of the coupling or turnbuckle 8 and rod section 10 from its threaded engagement with the threaded section 11, and the assembly or insertion of the rod section 49 with its coupling 50, tightening of its set screw 51 through the opening in the tubing 1, and assembly of the coupling tube 48.

Having thus disclosed the invention, I claim:

1. A tree trimming device comprising a tubular member, an operating rod slidably mounted in said tubular member, a saw attached to the forward end of said rod, a saw holder mounted at the forward end of the tubular member and in which the saw reciprocates, a saw guide pivoted upon the saw holder, tension means adapted to maintain the guide over the blade during the initial cutting operation, a limb hook carried upon a bell crank pivotally mounted upon the saw holder opposite to the pivotal mounting of the guide, a spring adapted to apply and maintain pressure upon the saw blade, and an operating handle adapted to reciprocate the operating rod and saw blade.

2. A tree trimming device comprising an enclosing housing, a reciprocating member operatively mounted in said housing, a saw blade secured to the forward end of said reciprocating member, a saw blade holder and a guide pivotally mounted on said holder at the forward end of said housing for controlling the operation of said blade, means for mounting said trimmer upon a limb to be cut, tension means for applying pressure to the saw blade in its cutting operation, and an operating handle for reciprocating said member and saw blade.

3. A tree trimming device comprising an enclosing housing, a reciprocating member operatively mounted in said housing, a saw blade secured to the forward end of said reciprocating member, a saw blade holder and a guide pivotally mounted on said blades at the forward end of said housing for controlling the operation of said blade, an arm pivotally mounted upon said holder, a limb hook adjustably carried by said arm, tension means for maintaining said hook in anchored position and applying pressure to the saw blade to secure optimum cutting action, and an operating handle for reciprocating the saw blade.

4. A tree trimming device comprising an enclosing housing, a reciprocating member operatively mounted in said housing, a saw blade secured to the forward end of said reciprocating member, a saw blade holder at the forward end of said housing for controlling the operation of said blade, an arm pivotally mounted upon said holder, a limb hook adjustably carried by said arm, tension means for maintaining said hook in anchored position and applying pressure to the saw blade to secure optimum cutting action, a guide pivotally mounted upon said saw holder for controlling the operation of the saw blade and prevent the blade from buckling during the initial cutting operation, and an operating handle for reciprocating the saw blade.

5. A tree trimming device comprising a hollow member, an operating rod slidably mounted in said hollow member and composed of a plurality of separable sections whereby its length may be adjusted in accordance with the requirements and the distance of the limb to be cut from the operator of the trimmer, a saw carried at the forward end of said operating rod, a saw holder carried at the forward end of said hollow member, a guide pivotally mounted on said saw holder for controlling operation of said blade, a bell crank pivoted upon said saw holder, a limb hook adjustably mounted upon said bell crank, tension means secured to an arm of said bell crank and to the saw holder and adapted to apply pressure to the saw blade, and a handle attached to said operating rod for reciprocating the rod and saw blade.

ELBERT R. POTTER.

CERTIFICATE OF CORRECTION.

Patent No. 2,273,329.                                              February 17, 1942.

ELBERT R. POTTER.

It is hereby certified that error appears in the printed specification of the above numbered patent requiring correction as follows: Page 2, second column, line 29, claim 3, for "blades" read --holder--; and that the said Letters Patent should be read with this correction therein that the same may conform to the record of the case in the Patent Office.

Signed and sealed this 28th day of April, A. D. 1942.

(Seal)                                            Henry Van Arsdale,
                                                   Acting Commissioner of Patents.